US012686910B2

(12) United States Patent
Aimoto et al.

(10) Patent No.: US 12,686,910 B2
(45) Date of Patent: Jul. 21, 2026

(54) MOLTEN METAL BATH COMPOSITION ANALYSIS SYSTEM, MOLTEN METAL BATH COMPOSITION ANALYSIS METHOD, HOT-DIP GALVANIZING BATH MANAGEMENT METHOD, AND HOT-DIP GALVANIZED STEEL SHEET MANUFACTURING METHOD

(71) Applicant: NIPPON STEEL CORPORATION, Tokyo (JP)

(72) Inventors: Michihiro Aimoto, Tokyo (JP); Norihiro Tsuji, Tokyo (JP); Tomonori Aoki, Tokyo (JP); Hideki Nishimura, Tokyo (JP); Naohiro Kodani, Tokyo (JP); Hiroki Takamaru, Tokyo (JP); Takeshi Harada, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 18/841,440

(22) PCT Filed: Jun. 21, 2023

(86) PCT No.: PCT/JP2023/022918
§ 371 (c)(1),
(2) Date: Aug. 26, 2024

(87) PCT Pub. No.: WO2023/249048
PCT Pub. Date: Dec. 28, 2023

(65) Prior Publication Data
US 2025/0179623 A1 Jun. 5, 2025

(30) Foreign Application Priority Data
Jun. 21, 2022 (JP) ................................. 2022-099507

(51) Int. Cl.
C23C 2/00 (2006.01)
C23C 2/06 (2006.01)
G01N 21/71 (2006.01)

(52) U.S. Cl.
CPC ................ *C23C 2/521* (2022.08); *C23C 2/06* (2013.01); *C23C 2/522* (2022.08); *G01N 21/718* (2013.01)

(58) Field of Classification Search
None
See application file for complete search history.

(56) References Cited

U.S. PATENT DOCUMENTS

2003/0234928 A1* 12/2003 Lucas .................. G01N 21/718
356/318
2006/0250614 A1 11/2006 Plessers et al.
2020/0354802 A1* 11/2020 Green ................. F27D 21/0014

FOREIGN PATENT DOCUMENTS

JP 09-157823 A 6/1997
JP 2005-530989 A 10/2005
(Continued)

*Primary Examiner* — Shamim Ahmed
*Assistant Examiner* — Bradford M Gates
(74) *Attorney, Agent, or Firm* — Myers Wolin, LLC

(57) ABSTRACT

A molten metal bath composition analysis system includes: a laser oscillator that oscillates a laser beam; a cylindrical probe that includes an opening end immersed in a molten metal bath, supplies an inert gas toward the opening end, and guides the laser beam to the opening end to irradiate a molten metal with the laser beam; and a detector that detects and spectroscopically analyzes plasma emission of the molten metal caused by the irradiation with the laser beam, wherein at least one of the position of the opening end of the cylindrical probe in the molten metal bath and the angle of the cylindrical probe with respect to a vertical direction can be controlled.

16 Claims, 6 Drawing Sheets

(56)  References Cited

FOREIGN PATENT DOCUMENTS

| JP | 2006-300819 | A  | 11/2006 |
| JP | 2007-514941 | A  | 6/2007  |
| WO | 2004/001394 | A2 | 12/2003 |

* cited by examiner

1

MOLTEN METAL BATH COMPOSITION ANALYSIS SYSTEM, MOLTEN METAL BATH COMPOSITION ANALYSIS METHOD, HOT-DIP GALVANIZING BATH MANAGEMENT METHOD, AND HOT-DIP GALVANIZED STEEL SHEET MANUFACTURING METHOD

CROSS-REFERENCE TO RELATED APPLICATION

This application is a National Phase under 35 U.S.C. 371 of PCT/JP2023/022918, filed on Jun. 21, 2023, and designated the U.S., which claims priority to Japanese Patent Application No. 2022-099507, filed on Jun. 21, 2022. The contents of each are wholly incorporated herein by reference.

TECHNICAL FIELD

The present disclosure relates to a molten metal bath composition analysis system, a molten metal bath composition analysis method, a hot-dip galvanizing bath management method, and a hot-dip galvanized steel sheet manufacturing method. The present application claims priority based on Japanese Patent Application No. 2022-099507 filed in Japan on Jun. 21, 2022, the contents of which are incorporated herein by reference.

RELATED ART

In a molten metal bath such as a hot-dip galvanizing bath, it is required to monitor and manage a constituent composition from a viewpoint of quality management of a product obtained by using the molten metal bath, for example, a hot-dip galvanized steel sheet, and a problem in management of operating conditions.

For example, in a hot-dip galvanizing manufacturing step, a trace amount of Al, Fe, or the like is added to a hot-dip galvanizing bath in order to properly control a plating coating and a steel sheet and to improve an anticorrosion effect. Along with operation, that is, passing of a steel sheet in a hot-dip galvanizing bath, Al tends to decrease and Fe tends to increase.

If the amount of a trace element in the hot-dip galvanizing bath deviates from an appropriate range, it may cause poor plating, or the trace element may be alloyed with zinc to form dross, thereby interfering with the operation. Therefore, it is important to continuously manage the concentration of the trace element, and to add the trace element or to remove dross according to the management such that the concentration of the trace element is within an appropriate range. The concentration fluctuation of the trace element is more significant when a passing speed of a steel sheet is increased for the purpose of improving productivity. Therefore, in such a case, it is highly necessary to continuously grasp the concentration in real time.

Patent Document 1 proposes a laser emission spectroscopic analysis method of a molten metal as a molten metal analysis method during refining. In addition, Patent Document 2 discloses a method and a device in which laser-induced breakdown spectroscopy (LIBS) is applied to analysis of a molten material. Patent Document 2 also specifically discloses measurement of concentrations of Al and Zn in a zinc plating process.

2

CITATION LIST

Patent Document

Patent Document 1: Japanese Unexamined Patent Application, First Publication No. 2006-300819
Patent Document 2: Published Japanese Translation No. 2005-530989 of the PCT International Publication

SUMMARY

Problems to be Solved

Both of the methods proposed in Patent Documents 1 and 2 are methods for irradiating a molten metal with a laser and detecting and spectroscopically analyzing plasma emission caused in the molten metal, and are capable of continuous composition analysis of the molten metal.

However, the present inventors have studied the methods as described above, and have encountered a problem that even in a case where there is no change in a composition of the molten metal, when measurement is continuously performed for a long time, for example, several hours, a measured value of the composition of the molten metal fluctuates even under a situation where operating conditions of a molten metal bath and the like are not changed and a possibility that the composition of the plating bath changes is considered to be low. When the measured value of the composition of the molten metal fluctuates as described above, a constituent composition of the molten metal bath cannot be appropriately managed.

Therefore, the present disclosure has been made in view of the above problems, and an object of the present disclosure is to provide a molten metal bath composition analysis system, a molten metal bath composition analysis method, a hot-dip galvanizing bath management method, and a hot-dip galvanized steel sheet manufacturing method, in which a fluctuation of a measured value of a composition is suppressed in continuous composition analysis of a molten metal bath over a long time.

Means for Solving the Problem

According to studies of the present inventors, it has been found, from measurement of a temperature of a molten metal at a distal end portion of a cylindrical probe that irradiates the molten metal with a laser beam or a pressure of a blowing gas, that a timing of a fluctuation of emission intensity has a high relationship with a timing of a fluctuation of the temperature of the molten metal at the distal end portion of the cylindrical probe or the gauge pressure of the blowing gas. Therefore, as a result of further studies, the present inventors have arrived at suppressing a fluctuation of a measured value of a composition by controlling an immersion depth and an immersion angle of the cylindrical probe.

The gist of the present disclosure completed based on the above findings is as follows.

[1] A molten metal bath composition analysis system according to an aspect of the present disclosure includes: a laser oscillator that oscillates a laser beam; a cylindrical probe that has an opening end immersed in a molten metal bath, supplies an inert gas toward the opening end, and guides the laser beam to the opening end to irradiate a molten metal with the laser beam; and a detection unit that detects and spectroscopically analyzes plasma emission of the molten metal caused by the irradiation with the laser beam, in which at least one of the position of the opening end of the cylindrical probe in the molten metal bath and the angle of the cylindrical probe with respect to a vertical direction can be controlled.

[2] The molten metal bath composition analysis system according to [1] may include a position control unit that controls at least one of the position of the opening end of the cylindrical probe in the molten metal bath and the angle of the cylindrical probe with respect to the vertical direction.

[3] The molten metal bath composition analysis system according to [1] may include a position control unit that controls the position of the opening end of the cylindrical probe in the molten metal bath and the angle of the cylindrical probe with respect to the vertical direction.

[4] The molten metal bath composition analysis system according to [2] or [3] may include at least one of a temperature sensor that measures a temperature of the molten metal at the opening end and a pressure sensor that measures a pressure of the inert gas, in which at least one of the position of the opening end of the cylindrical probe and the angle of the cylindrical probe with respect to the vertical direction may be controlled on the basis of at least one of the temperature of the molten metal measured by the temperature sensor and the pressure of the inert gas obtained by the pressure sensor.

[5] The molten metal bath composition analysis system according to any one of [1] to [4] may include at least one of a temperature sensor that measures a temperature of the molten metal at the opening end and a pressure sensor that measures a pressure of the inert gas, in which at least one of the position of the opening end of the cylindrical probe and the angle of the cylindrical probe with respect to the vertical direction may be controlled by any one or more of the following methods a to d:

a. controlling the gauge pressure of the inert gas obtained by the pressure sensor to be within a predetermined range;

b. controlling the fluctuation of the pressure of the inert gas to be equal to or less than a predetermined value;

c. controlling the temperature of the molten metal to be equal to or higher than a predetermined temperature; and d. controlling a temperature fluctuation of the molten metal to be equal to or less than a predetermined value.

[6] In the molten metal bath composition analysis system according to any one of [1] to [4], the molten metal may contain molten zinc, and the molten metal bath may be a hot-dip galvanizing bath.

[7] The molten metal bath composition analysis system according to [6] may include a pressure sensor that measures a pressure of the inert gas, in which at least one of the position of the opening end of the cylindrical probe and the angle of the cylindrical probe with respect to the vertical direction may be controlled such that the gauge pressure of the inert gas obtained by the pressure sensor is within a range of 10 to 20 kPa.

[8] The molten metal bath composition analysis system according to [6] or [7] may include a pressure sensor that measures the pressure of the inert gas, in which at least one of the position of the opening end of the cylindrical probe and the angle of the cylindrical probe with respect to the vertical direction may be controlled such that the fluctuation of the pressure of the inert gas obtained by the pressure sensor is 1.0 kPa or less.

[9] The molten metal bath composition analysis system according to any one of [6] to [8] may include a temperature sensor that measures a temperature of the molten metal at the opening end, in which at least one of the position of the opening end of the cylindrical probe and the angle of the cylindrical probe with respect to the vertical direction may be controlled such that the temperature of the molten metal measured by the temperature sensor is 440° C. or higher.

[10] The molten metal bath composition analysis system according to any one of [4] to [9] may include a temperature sensor that measures a temperature of the molten metal at the opening end, in which at least one of the position of the opening end of the cylindrical probe and the angle of the cylindrical probe with respect to the vertical direction may be controlled such that a fluctuation of the temperature of the molten metal measured by the temperature sensor is within 5° C.

[11] A molten metal bath composition analysis method according to another aspect of the present disclosure includes: immersing a cylindrical probe in a molten metal bath; supplying an inert gas to an opening end of the cylindrical probe; guiding a laser beam to the opening end to irradiate a molten metal with the laser beam; and detecting and spectroscopically analyzing plasma emission of the molten metal caused by the irradiation with the laser beam, in which at least one of a temperature of the molten metal and a pressure of the inert gas is measured, and at least one of the position of the opening end in the molten metal bath and the angle of the cylindrical probe with respect to a vertical direction is controlled on the basis of at least one of the temperature of the molten metal and the pressure of the inert gas.

[12] In the molten metal bath composition analysis method according to [11], at least one of the position of the opening end of the cylindrical probe and the angle of the cylindrical probe with respect to the vertical direction may be controlled by any one or more of the following methods a to d:

a. controlling the gauge pressure of the inert gas to be within a predetermined range;

b. controlling the fluctuation of the pressure of the inert gas to be equal to or less than a predetermined value;

c. controlling the temperature of the molten metal to be equal to or higher than a predetermined temperature; and d. controlling a temperature fluctuation of the molten metal to be equal to or less than a predetermined value.

[13] In the molten metal bath composition analysis method according to [11], the molten metal may be molten zinc, and the molten metal bath may be a hot-dip galvanizing bath.

[14] In the molten metal bath composition analysis method according to [13], at least one of controlling the position of the opening end of the cylindrical probe and controlling the angle of the cylindrical probe with respect to the vertical direction may be performed such that the gauge pressure of the inert gas is within a range of 10 to 20 kPa.

[15] In the molten metal bath composition analysis method according to [13] or [14], at least one of controlling the position of the opening end of the cylindrical probe and controlling the angle of the cylindrical probe with respect to the vertical direction may be performed such that the fluctuation of the pressure of the inert gas is within 1.0 kPa.

[16] In the molten metal bath composition analysis method according to any one of [13] to [15], at least one of controlling the position of the opening end of the cylindrical probe and controlling the angle of the cylindrical probe with respect to the vertical direction may be performed such that the temperature of the molten metal is 440° C. or higher.

[17] In the molten metal bath composition analysis method according to any one of [13] to [16], at least one of controlling the position of the opening end of the cylindrical probe and controlling the angle of the cylindrical probe with respect to the vertical direction may be performed such that a fluctuation of the temperature of the molten zinc at the opening end is within 5° C.

[18] A hot-dip galvanizing bath management method according to still another aspect of the present disclosure includes: a step of measuring a concentration of at least one of Al and Fe in a hot-dip galvanizing bath by the molten metal bath composition analysis method according to any one of [11] to [17]; and a step of controlling the concentration of either of Fe and Al in the hot-dip galvanizing bath on the basis of the concentration.

[19] A hot-dip galvanized steel sheet manufacturing method according to further still another aspect of the present disclosure includes: a step of measuring the concentration of at least one of Al and Fe in a hot-dip galvanizing bath by the molten metal bath composition analysis method according to any one of [11] to [17]; and a step of controlling the concentration of either of Fe and Al in the hot-dip galvanizing bath on the basis of the concentration.

Effects

As described above, according to the above aspects of the present disclosure, it is possible to suppress the fluctuation of a measured value of a composition in continuous composition analysis of a molten metal bath over a long time. Therefore, the present disclosure is suitable for continuously monitoring and managing a constituent composition of the molten metal bath.

DETAILED DESCRIPTION

Figure 1:
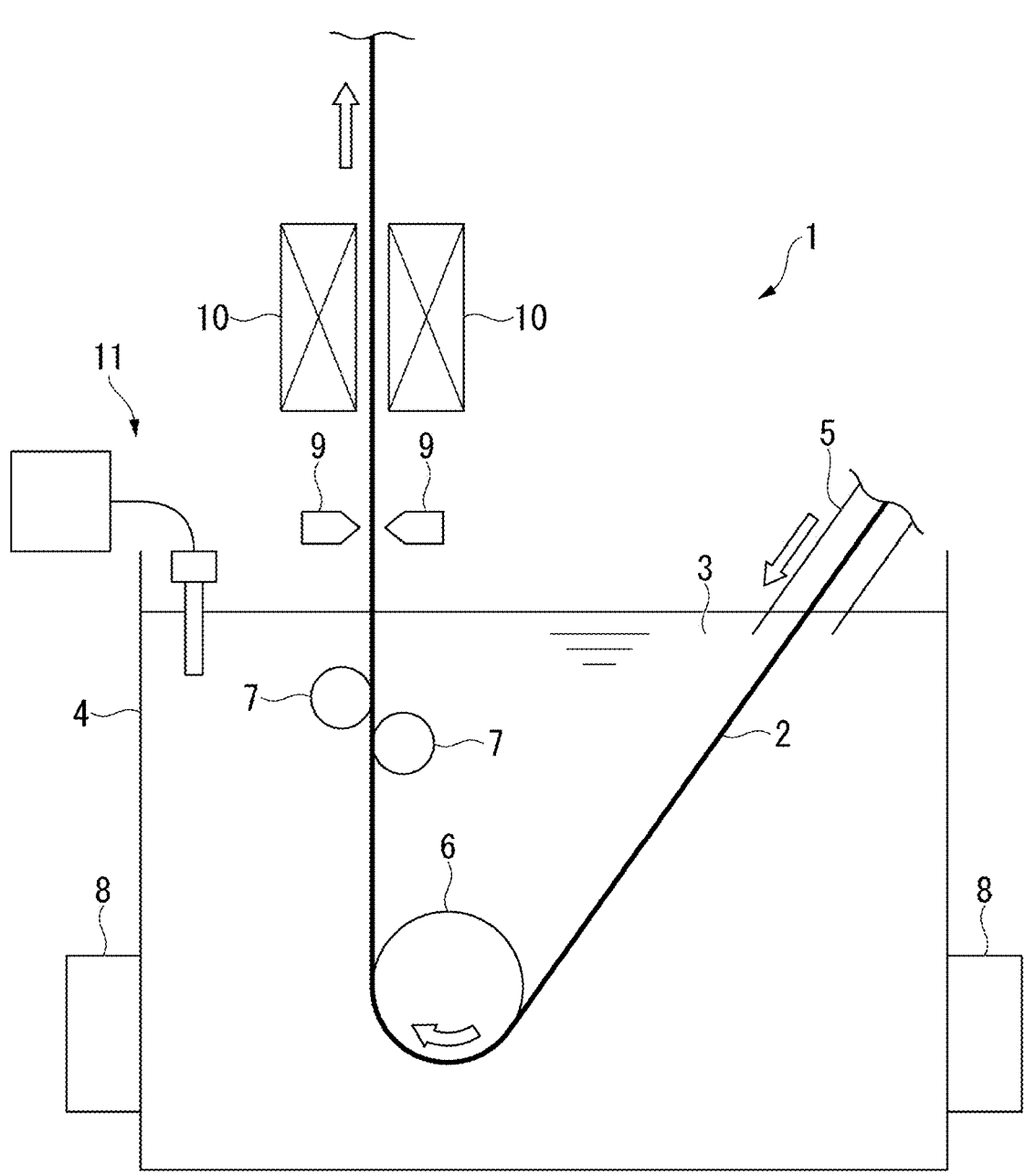
FIG. 1 is a diagram illustrating the schematic configuration of a hot-dip galvanizing device according to an embodiment of the present disclosure.

Hereinafter, preferred embodiments of the present disclosure will be described in detail with reference to the accompanying drawings. Note that, in the present specification and the drawings, constituent elements having substantially the same functional configuration are denoted by the same reference numbers, and redundant description is omitted.

1. Idea of the Present Disclosure

First, prior to description of embodiments of the present disclosure, an idea leading to the present disclosure will be described.

As described above, the present inventors have studied a proposed method for irradiating a molten metal with a laser and detecting and spectroscopically analyzing plasma emission caused in the molten metal, and have encountered a problem that, in this method, even in a case where there is no change in operating conditions of a molten metal bath and the like and it is considered that there is a high possibility that there is no change in a composition of the molten metal, a measured value of the composition of the molten metal fluctuates when measurement is continuously performed for a long time, for example, several hours.

The present inventors made intensive studies in order to solve such a problem of a time-dependent fluctuation of a measured value, and first focused on a pressure of an inert gas supplied to a measurement surface of the molten metal at the time of measurement. The present inventors have considered that, in order to stably cause plasma emission in the molten metal using a laser, it is necessary to stably supply an inert gas such as an argon gas by bubbling such that plasma can be stably generated near the measurement surface of the molten metal irradiated with the laser. In addition, the present inventors have considered that, in order to suppress a fluctuation of a measured value of a composition of the molten metal, a fluctuation of a state of the inert gas to be supplied is preferably small.

As a result of studies, the present inventors have found that a pressure of the inert gas and a temperature of the molten metal at a distal end portion of a probe that irradiates the molten metal with a laser beam fluctuate even in a case where the amount of a constituent composition in the molten metal is measured under conditions where operating conditions of the molten metal bath and the like are not changed and a bath temperature of the molten metal and an immersion depth of the probe are the same (that is, even in a case where a fluctuation of the composition in the molten metal is considered to be relatively small). In addition, the present inventors have also found, from measurement of the temperature of the molten metal at the distal end portion of the probe that irradiates the molten metal with a laser beam or a gauge pressure of a blowing gas, that a timing of a fluctuation of emission intensity has a high relationship with a timing of a fluctuation of the temperature of the molten metal at the distal end portion of the probe or the pressure of the inert gas. Note that, in the above description, the bath temperature of the molten metal means the temperature of the molten metal measured at a predetermined position.

The present inventors, who had found such a relationship between the measured value and the pressure of the inert gas or the temperature of the molten metal at the distal end portion of the probe, first examined a cause of the pressure fluctuation of the inert gas. The inert gas is supplied to the measurement surface of the molten metal via the probe. On the other hand, viscosity of the molten metal can also affect a state of bubbling of the inert gas. For example, when the viscosity of the molten metal is high, bubbling is difficult, and the pressure of the inert gas increases. Here, it is not easy to measure the viscosity of the molten metal in a time-dependent manner, but on the other hand, the viscosity of the molten metal has a large correlation with the temperature of the molten metal. Therefore, the present inventors have considered that if the temperature at a measurement position of the molten metal bath can be monitored and the measurement position (immersion depth) can be controlled such that the fluctuation of the temperature of the molten metal bath at the measurement position is reduced, an unintended fluctuation of a measured value of a composition of the molten metal can be suppressed. Therefore, the present inventors have estimated that the fluctuation of the pressure of the inert gas can be suppressed in a case where the fluctuation of the viscosity of the molten metal is small, in other words, in a case where the fluctuation of the temperature of the molten metal at the measurement position is small.

In addition, the present inventors have estimated that bubbling can be stabilized also by changing the angle of the probe with respect to the vertical direction, and fluctuations of the pressure of the inert gas and the temperature of the molten metal at the distal end portion of the probe can be suppressed.

From the above, the present inventors have considered that it is possible to suppress the fluctuation of the measured value of the composition by adjusting the immersion depth and the immersion angle of the probe such that the temperature of the molten metal at the distal end portion of the probe or the pressure of the inert gas is within a predetermined range, and as a result of further intensive studies, have completed the present disclosure. Hereinafter, the present disclosure will be described in detail with exemplary embodiments. Note that the fluctuation of the measured value of the composition of the molten metal means a difference between a composition measured value obtained by taking the molten metal bath as an analysis sample and performing off-line chemical analysis and a measured value of the composition of the molten metal measured by a LIBS method. Hereinafter, in the present specification, a composition measured value obtained by off-line chemical analysis is described as a true value for convenience. That is, the present inventors have found a composition analysis system and a composition analysis method for a molten metal, which can obtain a measurement result close to a true value of the composition of the molten metal.

2. Hot-Dip Galvanizing Device

Figure 2:
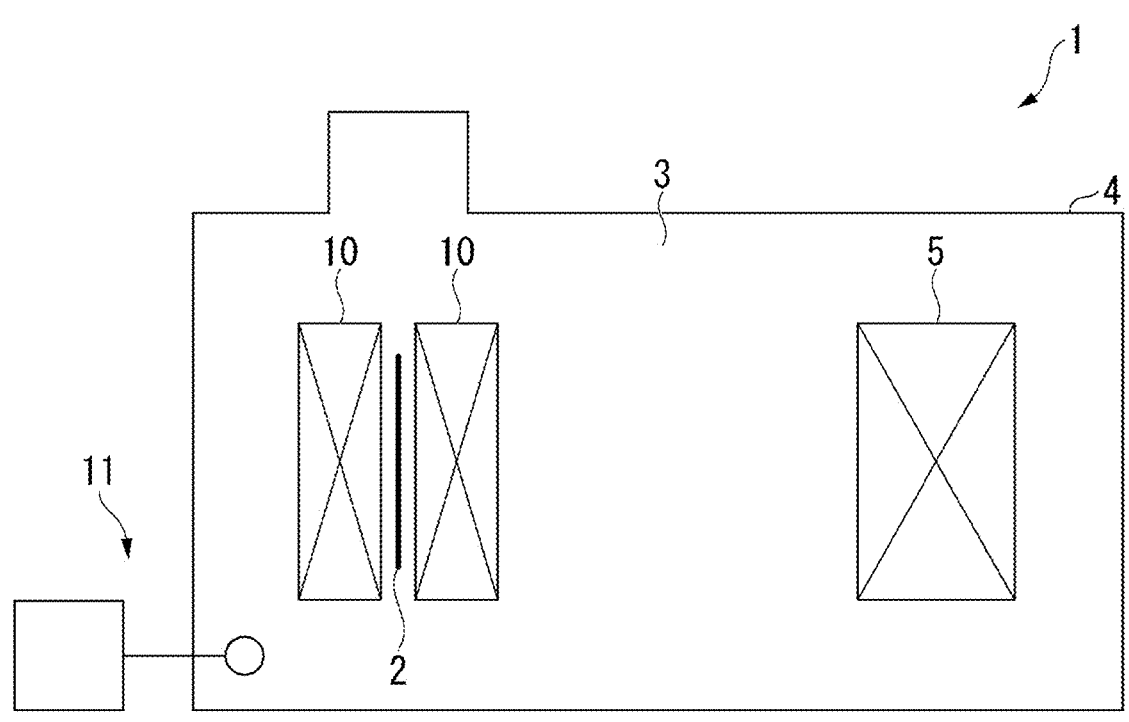
FIG. 2 is a plan view illustrating a schematic configuration of the hot-dip galvanizing device according to the embodiment.

First, an example of a hot-dip galvanizing device including a composition analysis system according to the present embodiment will be described. FIG. 1 is a side view illustrating a schematic configuration of a hot-dip galvanizing device 1 according to an embodiment of the present disclosure, and FIG. 2 is a plan view illustrating the schematic configuration of the hot-dip galvanizing device 1 illustrated in FIG. 1 (as viewed from an upper surface of a hot-dip galvanizing bath). Note that, as an example of a molten metal bath, a hot-dip galvanizing bath 3 (hereinafter, also simply referred to as "plating bath") in the hot-dip galvanizing device 1 will be representatively described, but the present disclosure is naturally not limited thereto, and can be applied to any other molten metal bath.

The hot-dip galvanizing device 1 is a device for continuously attaching molten zinc to a surface of a steel strip 2 by immersing the steel strip 2 in the plating bath 3 filled with molten zinc. The hot-dip galvanizing device 1 includes a plating tank 4, a snout 5, a pair of upper and lower support rolls 7 and 7, an inductor 8, a gas wiping device 9, an alloying furnace 10, and a composition analysis system 11.

The plating tank 4 stores the plating bath 3 made of molten zinc. Note that, the plating bath 3 according to the present embodiment may contain about 0.12 to 0.15 mass % of Al and about 0.02 to 0.1 mass % of Fe in addition to Zn. The temperature of the plating bath 3 is about 430 to 480° C. The snout 5 is inclined such that one end thereof is immersed in the plating bath 3. An in-bath roll 6 is disposed at a lowermost position inside the plating tank 4. The in-bath roll 6 rotates along the illustrated arrow by contact and shearing with the steel strip 2.

The support rolls 7 are disposed on a downstream side of the in-bath roll 6 in a conveyance direction of the steel strip 2 inside the plating tank 4, and are disposed so as to sandwich the steel strip 2 fed from the in-bath roll 6 between the left support roll 7 and the right support roll 7. The support rolls 7 are rotatably supported by a bearing (not illustrated) (for example, a sliding bearing or a rolling bearing). Note that only one support roll or three or more support rolls may be disposed, or no support roll may be disposed.

The inductor 8 is an example of a heating device that heats the plating bath 3 filled in the plating tank 4. As illustrated in FIG. 1, a plurality of the inductors 8 according to the present embodiment are disposed on side wall portions of the plating tank 4 to adjust the plating bath 3 to a predetermined bath temperature. Note that the unit for heating the plating bath 3 is not limited to the inductor 8, and a known technique is used.

The gas wiping device 9 is disposed above the plating tank 4, and has a function of spraying a gas (for example, nitrogen or air) onto both surfaces of the steel strip 2 to scrape off molten metal adhering to the surfaces of the steel strip 2, thereby controlling an adhesion amount of the molten metal.

The alloying furnace 10 is an example of a heating device that heats the steel strip 2 after gas wiping to a predetermined temperature. The alloying furnace 10 increases the temperature of the steel strip 2 by heating to promote alloying of a plating layer of the molten metal adhering to a surface of the steel strip 2. Note that, as the alloying furnace 10, for example, a known technique such as an induction heating type heater is used.

The steel strip 2 annealed in an annealing furnace, which is an upstream step, is immersed in the plating tank 4 filled with the plating bath 3 via the snout 5, passes the in-bath roll 6 and the support rolls 7 and 7, is pulled up in the vertical direction, and is conveyed to the outside of the plating bath 3. The basis weight of the molten metal adhering to a surface of the steel strip 2 conveyed to the outside of the plating bath 3 is adjusted by the gas wiping device 9, and then the steel strip 2 passes the alloying furnace 10.

The composition analysis system 11 is an analysis system having a function of detecting and analyzing each composition present in the plating bath 3. From data of signal intensity of a target element obtained by irradiation with a pulsed laser while supplying a gas into the plating bath 3, the composition analysis system 11 according to the present embodiment quantifies the target element containing at least one of Fe and Al. That is, the composition analysis system 11 according to the present embodiment has a configuration for performing a LIBS method using a hot-dip galvanizing bath as a measurement target. Note that, as illustrated in FIG. 2, main devices constituting the composition analysis system 11 (for example, a laser device 12, a cylindrical probe 13, a support member 32, a fixing member 33, and a drive unit 34, which will be described in detail in the following paragraphs.) are disposed near a corner portion of the plating bath 3. However, the present disclosure is not limited to the illustrated aspect, and the composition analysis system 11 can be disposed anywhere in the plating bath 3 and can be used to measure any position in the plating bath 3. Hereinafter, a functional configuration example of the composition analysis system 11 will be described.

Figure 3:
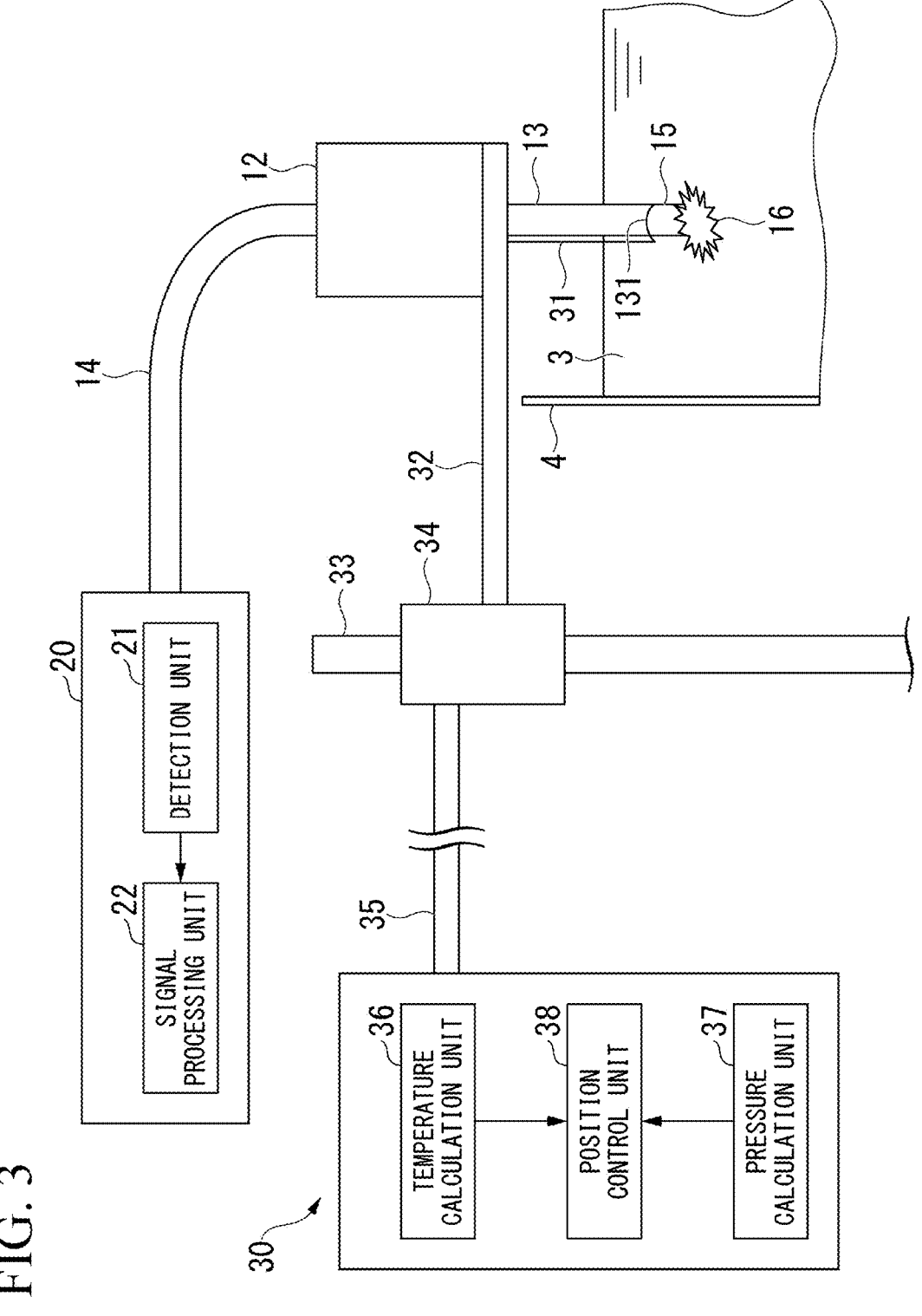
FIG. 3 is a diagram illustrating an example of the configuration of a composition analysis system according to another embodiment of the present disclosure.

FIG. 3 is a diagram illustrating an example of a configuration of the composition analysis system 11 according to the present embodiment. As illustrated in FIG. 3, the composition analysis system 11 according to the present embodiment includes the laser device 12, the cylindrical probe 13, a transmission cable 14, a processing device 20, and a position controller 30.

The laser device 12 is a device including a laser oscillator (not illustrated) that emits pulsed a pulsed laser beam (hereinafter, also simply referred to as "laser beam") and an optical system (not illustrated) that guides the pulsed laser beam to the cylindrical probe 13 and guides plasma-induced light received via the cylindrical probe 13 to the transmission cable 14. The laser oscillator has a function of generating plasma at a gas-liquid interface between a gas supplied by the cylindrical probe 13 described later and the plating bath 3 by a laser beam oscillated by the laser oscillator. The laser oscillator preferably has a function of emitting a pulsed laser beam that evaporates each composition such as Zn, Fe, or Al without selectivity such that the plasma reflects the composition of the plating bath 3. For example, the laser oscillator may be a Nd:YAG laser widely used as a high-output pulsed laser. In addition, a head of the laser oscillator may have an adjusting mechanism for adjusting the spot diameter or the like of a laser.

The optical system includes an optical system that guides a laser beam emitted from the laser oscillator to the cylindrical probe 13, and an optical system that guides plasma-induced light received via the cylindrical probe 13 to the transmission cable 14. These optical systems are each constituted by an optical member such as a lens, a mirror, or a dichroic mirror.

The cylindrical probe 13 is a cylindrical member constituting an optical path between the plating bath 3 and the laser device 12, and is disposed such that one end thereof is connected to the laser device 12 and the other end thereof, which is an opening end 131, is immersed in the plating bath 3. A pulsed laser beam emitted from the laser device 12 is guided to the cylindrical probe 13 and can be focused in the plating bath 3 on the opening end 131 side. In addition, in the cylindrical probe 13, an inert gas is supplied from an arbitrary position toward the opening end 131. As illustrated in FIG. 3, the inert gas is discharged from the opening end 131 into the plating bath 3 and is foamed to generate bubbles 15. The molten metal in the plating bath 3 is irradiated with the laser beam guided via the cylindrical probe 13, whereby plasma 16 is generated at a gas-liquid interface between the generated bubbles 15 and the molten metal. The inert gas is preferably an inert gas generally used in plasma emission spectrometry, such as Ar or He.

The opening end 131 of the cylindrical probe 13 may be perpendicular or oblique to a longitudinal direction.

The transmission cable 14 is a cable for transmitting the light that has caused plasma emission in the plating bath 3 and has been guided to the laser device 12 via the cylindrical probe 13 to the processing device 20. The transmission cable 14 is implemented by a general light guide cable such as an optical fiber cable.

The processing device 20 has a function of dispersing and detecting the light transmitted via the transmission cable 14 and performing processing on an obtained signal. The processing device 20 includes a detection unit 21 and a signal processing unit 22.

The detection unit 21 has a function of spectroscopically analyzing the light transmitted via the transmission cable 14. For example, the detection unit 21 can be implemented by a spectroscope and a photoelectric converter. The spectroscope is not particularly limited as long as it is a spectroscope having a resolution that can disperse light of wavelengths corresponding to at least Zn, Fe, and Al, and a spectroscope having a known spectroscopic unit can be applied. The photoelectric converter is not particularly limited as long as it is a photoelectric converter capable of detecting intensity of dispersed light, and for example, may be an optical sensor such as a charge coupled device (CCD) or a complementary metal oxide semiconductor (CMOS), or a photomultiplier tube (PMT). The detection unit 21 according to the present embodiment measures a signal in a wavelength band including wavelengths corresponding to Zn, Fe, and Al, and outputs the signal as measurement data. The measurement data regarding the signal corresponding to each element detected by the detection unit 21 is output to the signal processing unit 22.

The signal processing unit 22 has a function of performing processing on the acquired measurement data (signal). Specifically, the signal processing unit 22 calculates data (intensity data) related to signal intensity of each target element from a signal for each irradiation with a pulsed laser beam. The signal processing unit 22 further calculates a concentration of each constituent composition in the plating bath 3 on the basis of the calculated intensity data. Data regarding each calculated concentration is output to an output unit (not illustrated) such as a display as necessary.

Here, examples of the concentration of the constituent composition calculated in the plating bath 3 include a Zn concentration such as the total Zn concentration, the dissolved Zn concentration, or the solid Zn concentration, an Al concentration such as the total Al concentration, the dissolved Al concentration, or the solid Al concentration, an Fe concentration such as the total Fe concentration, the dissolved Fe concentration, or the solid Fe concentration, and the concentration of an impurity.

The signal processing unit 22 is implemented by hardware including, for example, an arithmetic device such as a CPU, a main storage device such as a read only memory (ROM) or a random-access memory (RAM), and an auxiliary storage device such as a hard disk or a flash memory. The signal processing unit 22 may be constituted by one piece of hardware or a plurality of pieces of hardware. Note that the signal processing unit 22 may be implemented by an embedded system.

The position controller 30 includes a temperature sensor 31, the support member 32, the fixing member 33, the drive unit 34, a transmission cable 35, a temperature calculation unit 36, a pressure calculation unit 37, a position control unit 38, and a pressure sensor (not illustrated).

The temperature sensor 31 is, for example, a thermocouple, and has a distal end disposed near the opening end 131 such that a temperature of the molten metal at the opening end 131 of the cylindrical probe 13 can be detected. In addition to the thermocouple, examples of the temperature sensor 31 include a barometric thermometer, a vapor pressure thermometer, a mercury thermometer, a bimetal thermometer, a platinum resistance thermometer, a thermistor, a semiconductor temperature sensor, a crystal thermometer, a temperature indicator, a liquid crystal thermometer, a quantum temperature sensor, and a thermal infrared sensor. Examples of the thermal infrared sensor include an infrared thermograph. The temperature of the molten metal measured by the temperature sensor 31 is transmitted to the temperature calculation unit 36 via the support member 32, the drive unit 34, and a cable (not illustrated) disposed in the transmission cable 35. As the temperature of the molten metal, the temperature of the molten metal at the opening end 131 may be measured through the cylindrical probe 13 using a radiation thermometer.

The support member 32 supports the laser device 12 and the cylindrical probe 13. The support member 32 can be, for example, a plate-shaped table. In addition, the support member 32 is driven so as to have an angle with respect to a horizontal plane by a drive unit 34 such as a built-in motor of the drive unit described later according to an instruction from the position control unit 38 described later. This makes it possible to change the angle of the cylindrical probe 13 with respect to the vertical direction. Note that the support member is not limited to the illustrated aspect, and may be, for example, a member capable of holding the laser device 12 and the cylindrical probe 13 or a member from which the laser device 12 and the cylindrical probe 13 can be suspended.

The fixing member 33 is a rod-shaped member disposed outside the plating tank 4 and having a positional relationship fixed with respect to the plating tank 4. The drive unit 34 is attached to the fixing member 33.

The drive unit 34 fixes the support member 32 and is movable along the fixing member 33. The drive unit 34 moves to an arbitrary position (immersion depth) along the fixing member 33 by a drive unit such as a built-in motor according to an instruction from the position control unit 38 described later. This makes it possible to change the immersion depth of the opening end 131 of the cylindrical probe 13 in the plating bath 3. That is, the support member 32 supporting the laser device 12 and the cylindrical probe 13 is movable with respect to the fixing member 33 using the drive unit 34, whereby the position (immersion depth) of the opening end 131 of the cylindrical probe 13 can be controlled. Similarly, the angle of the cylindrical probe 13 with respect to the vertical direction can be controlled according to an instruction from the position control unit 38. That is, according to an instruction from the position control unit 38, the angle of the cylindrical probe 13 with respect to the vertical direction and the immersion depth of the opening end 131 of the cylindrical probe 13 in the plating bath 3 (the position of the opening end 131) can be controlled.

The transmission cable 35 is a cable for connecting the temperature calculation unit 36, the pressure calculation unit 37, and the position control unit 38 to other units of the position controller 30. For example, temperature information detected by the temperature sensor 31 is transmitted to the temperature calculation unit 36 via the transmission cable 35. In addition, information on the position of the opening end 131 of the cylindrical probe 13 determined by the position control unit 38 is transmitted as an instruction to the drive unit 34 via the transmission cable 35. In addition, information on the angle of the opening end 131 of the cylindrical probe 13 determined by the position control unit 38 is transmitted as an instruction to the drive unit 34 via the transmission cable 35.

The temperature calculation unit 36 continuously detects a temperature of the molten metal at the opening end 131 of the cylindrical probe 13 on the basis of the temperature information on the temperature of the molten metal received by the temperature sensor 31. Information on the detected temperature of the molten metal is transmitted to the position control unit 38. In addition, the information on the temperature of the molten metal detected by the temperature calculation unit 36 is output to an output unit such as a display as necessary.

The pressure calculation unit 37 continuously detects a pressure (Note that details of the pressure will be described later.) of the inert gas at the opening end 131 of the cylindrical probe 13 on the basis of pressure information on the pressure of the inert gas received by the pressure sensor. Information on the detected pressure of the inert gas is transmitted to the position control unit 38. In addition, the information on the pressure of the inert gas detected by the pressure calculation unit 37 is output to an output unit such as a display as necessary.

The position control unit 38 controls at least one of the position (immersion depth) of the opening end 131 of the cylindrical probe 13 and the angle of the cylindrical probe 13 with respect to the vertical direction. In the present embodiment, the position control unit 38 controls the position of the opening end 131 of the cylindrical probe 13 and the angle of the cylindrical probe 13 with respect to the vertical direction on the basis of at least one of the temperature (including a temperature fluctuation, the same applies hereinafter) of the molten metal detected by the temperature calculation unit 36 and the pressure (including a pressure fluctuation, the same applies hereinafter) of the inert gas detected by the pressure calculation unit 37.

By controlling at least one of the position (immersion depth) of the opening end 131 of the cylindrical probe 13 and the angle of the cylindrical probe 13 with respect to the vertical direction on the basis of one or both of the pressure of the inert gas detected by the pressure calculation unit 37 and the temperature of the molten metal detected by the temperature calculation unit 36, bubbling of the inert gas is stabilized, and plasma is more stably generated near a measurement surface of the molten metal irradiated with a laser. As a result, the fluctuation of a measured value of a composition of the molten metal can be further suppressed over a long time.

That is, by controlling the position of the opening end 131 of the cylindrical probe 13 and the angle of the cylindrical probe 13 with respect to the vertical direction on the basis of the temperature of the molten metal detected by the temperature calculation unit 36 and the pressure of the inert gas detected by the pressure calculation unit 37, the fluctuation of the measured value of the composition of the molten metal can be further suppressed over a long time.

A pressure sensor that measures the pressure of a gas can be divided into two types: a type that measures the gauge pressure itself obtained by subtracting the atmospheric pressure from the pressure of a gas, and a type that measures the absolute pressure. In other words, the absolute pressure is the sum of the gauge pressure and the atmospheric pressure. In the present embodiment, any of the two types of pressure sensors can be used. Note that, when the former type of pressure sensor that measures a gauge pressure is used, the gauge pressure does not need to be calculated. When the latter type of pressure sensor is used, the gauge pressure is calculated by subtracting the atmospheric pressure from a measured total pressure in order to obtain the gauge pressure. At this time, the atmospheric pressure may be measured by a known method, but the gauge pressure may be calculated by subtracting 101.3 kPa from a measured value. In a case where the fluctuation amount of a pressure of a gas is obtained, the fluctuation amount of a measured value (gauge pressure or total pressure) is used as it is regardless of which type of pressure sensor is used. Examples of the pressure sensor include, in addition to a diaphragm type pressure sensor, a liquid column pressure gauge, an annular pressure gauge, a stress pressure gauge, a Bourdon tube pressure gauge, an aneroid pressure gauge, and a bellows type pressure sensor.

The pressure sensor may be, for example, a diaphragm type pressure sensor, and may be disposed in an introduction path of an inert gas such that a pressure of the inert gas can be detected. Information on the pressure of the inert gas measured by the pressure sensor is transmitted to the pressure calculation unit 37 via a cable (not illustrated) disposed in the transmission cable 35.

In the composition analysis system 11 according to the present embodiment, at least one of the position of the opening end 131 of the cylindrical probe 13 and the angle of the cylindrical probe 13 with respect to the vertical direction is preferably controlled by any one or more of the following methods a to d:

a. controlling the gauge pressure of an inert gas obtained by a pressure sensor to be within a predetermined range;

b. controlling the fluctuation of the pressure of the inert gas to be equal to or less than a predetermined value;

c. controlling the temperature of the molten metal to be equal to or higher than a predetermined temperature; and d. controlling a temperature fluctuation of the molten metal to be equal to or less than a predetermined value.

The above control is implemented by the position control unit 38.

In the above method a, a preliminary test or the like is performed in advance, a range of the gauge pressure for a fluctuation range of a LIBS analysis value to be within an allowable fluctuation range is determined in advance by the preliminary test or the like, and the gauge pressure is controlled so as to be within the range. In the method b, a preliminary test or the like is performed in advance, a threshold of a fluctuation of the pressure of the inert gas for a fluctuation range of a LIBS analysis value to be within an allowable fluctuation range is determined in advance by the preliminary test or the like, and the fluctuation of the pressure of the inert gas is controlled so as to be equal to or less than the threshold. In the method c described above, a preliminary test or the like is performed in advance, the threshold of the temperature of the molten metal for a fluctuation range of a LIBS analysis value to be within an allowable fluctuation range is determined in advance by the preliminary test or the like, and the temperature of the molten metal is controlled so as to be equal to or more than the threshold. In the method d described above, a preliminary test or the like is performed in advance, the threshold of the fluctuation of the temperature of the molten metal for a fluctuation range of a LIBS analysis value to be within an allowable fluctuation range is determined in advance by the preliminary test or the like, and the fluctuation of the temperature of the molten metal is controlled so as to be equal to or less than the threshold.

Here, the plating bath 3 is, for example, a hot-dip galvanizing bath, and the molten metal in the plating bath 3 contains molten zinc as a main composition. In a case where the plating bath 3 is a hot-dip galvanizing bath, the position control unit 38 preferably controls at least one of the position of the opening end 131 of the cylindrical probe 13 and the angle of the cylindrical probe 13 with respect to the vertical direction such that a gauge pressure of the inert gas detected by the pressure calculation unit 37 is within a range of 10 to 20 kPa. By controlling the position (immersion depth) of the opening end 131 of the cylindrical probe 13 or controlling the angle of the cylindrical probe 13 with respect to the vertical direction such that the gauge pressure of the inert gas detected by the pressure calculation unit 37 is within a range of 10 to 20 kPa, the fluctuation of a measured value of a composition of the molten metal can be further suppressed over a long time, for example, by making bubbling of the inert gas more stable. Note that, as necessary, a preliminary test or the like may be performed in advance, the range (a narrower range within the range of 10 to 20 kPa) of the gauge pressure for a fluctuation range of a LIBS analysis value to be within an allowable fluctuation range may be determined in advance by the preliminary test or the like, and at least one of the position of the opening end 131 of the cylindrical probe 13 and the angle of the cylindrical probe 13 with respect to the vertical direction may be controlled such that the gauge pressure is within the range.

In addition, the position control unit 38 preferably controls at least one of the position of the opening end 131 of the cylindrical probe 13 and the angle of the cylindrical probe 13 with respect to the vertical direction such that a fluctuation of a pressure of the inert gas detected by the pressure calculation unit 37 (a difference between a maximum pressure and a minimum pressure during a measurement period) is 1.0 kPa or less. By controlling the position of the opening end 131 of the cylindrical probe 13 or controlling the angle of the cylindrical probe 13 with respect to the vertical direction such that the fluctuation of the pressure of the inert gas detected by the pressure calculation unit 37 is 1.0 kPa or less, a fluctuation of a measured value of a composition of the molten metal can be further suppressed over a long time, for example, by making bubbling of the inert gas more stable. Note that the fluctuation of the pressure of the inert gas detected by the pressure calculation unit 37 is preferably as small as possible. Therefore, the fluctuation is preferably 0 kPa. Note that, as necessary, a preliminary test or the like may be performed in advance, the threshold (a threshold smaller than 1.0 kPa) of the fluctuation of the pressure of the inert gas for a fluctuation range of a LIBS analysis value to be within an allowable fluctuation range may be determined in advance by the preliminary test or the like, and at least one of the position of the opening end 131 of the cylindrical probe 13 and the angle of the cylindrical probe 13 with respect to the vertical direction may be controlled such that the fluctuation of the gauge pressure is within the range.

In a case where the plating bath 3 is a hot-dip galvanizing bath, the position control unit 38 preferably controls at least one of the position of the opening end 131 of the cylindrical probe 13 and the angle of the cylindrical probe 13 with respect to the vertical direction such that a temperature of the molten metal detected by the temperature calculation unit 36 is 440° C. or higher. By controlling at least one of the position of the opening end 131 of the cylindrical probe 13 and the angle of the cylindrical probe 13 with respect to the vertical direction such that the temperature of the molten metal is 440° C. or higher, a fluctuation of a measured value of a composition of the molten metal can be further suppressed over a long time, for example, by preventing a change in viscosity of the molten metal near the opening end 131 of the cylindrical probe 13 or suppressing a change in the gage pressure of the inert gas supplied to bubbling. Note that the upper limit value is not particularly limited, but if there is a preferred upper limit of the temperature of the molten metal in the hot-dip galvanizing bath, the upper limit temperature may be used as an upper limit value of the temperature of the molten metal in the present disclosure. Note that, in a case where the temperature of the molten metal is set to a higher temperature, there may be an adverse effect on an analysis device due to radiation heat from the molten metal. Furthermore, there are problems such as energy loss due to high temperature, loss of the molten metal due to evaporation thereof, peeling of plating, and an increase in the amount of dissolved base metal in a zinc bath. Therefore, in a case of a hot-dip galvanizing bath, operation at a temperature exceeding 500° C. is generally not performed, and there is no influence on implementation of the present disclosure as long as the temperature is at such a level. In a case where the plating bath 3 is a hot-dip galvanizing bath, for example, in order to suppress evaporation loss of molten zinc, the temperature of the molten metal detected by the temperature calculation unit 36 is preferably 510° C. or lower or 500° C. or lower. The temperature of the molten metal is more preferably 480° C. or lower. Note that, as necessary, a preliminary test or the like may be performed in advance, the threshold (the threshold on higher temperature side than a temperature of 440° C. or higher) of the molten metal for a fluctuation range of a LIBS analysis value to be within an allowable fluctuation range may be determined in advance by the preliminary test or the like, and at least one of the position of the opening end 131 of the cylindrical probe 13 and the angle of the cylindrical probe 13 with respect to the vertical direction may be controlled such that the temperature of the molten metal is within the range.

In addition, the position control unit 38 preferably controls at least one of the position of the opening end 131 of the cylindrical probe 13 and the angle of the cylindrical probe 13 with respect to the vertical direction such that a change in the temperature of the molten metal detected by the temperature calculation unit 36 is within 5° C. This makes it possible to further suppress a fluctuation of a measured value of a composition of the molten metal over a long time. Note that in a case where pieces of measurement data of luminescence signal intensities of elements are compared with each other, temperatures of the molten metal detected by the temperature calculation unit 36 only need to be in the same temperature range by controlling at least one of the position of the opening end 131 and the angle of the cylindrical probe 13 with respect to the vertical direction in all the measurements. For example, in a case where a correlation between a luminescence signal intensity of an element and an element concentration is used as a calibration curve, by performing measurement within this temperature range even at the time of preparing the calibration curve, the obtained luminescence signal intensity of the element can be more accurately converted into the concentration of the element. Note that, as necessary, a preliminary test or the like may be performed in advance, a threshold (a threshold smaller than 5° C.) of a fluctuation of the temperature of the molten metal for a fluctuation range of a LIBS analysis value to be within an allowable fluctuation range may be determined in advance by the preliminary test or the like, and at least one of the position of the opening end 131 of the cylindrical probe 13 and the angle of the cylindrical probe 13 with respect to the vertical direction may be controlled such that the temperature fluctuation of the molten metal is within the range.

In the composition analysis system 11 according to the present embodiment, a method for controlling at least one of the position of the opening end 131 of the cylindrical probe 13 and the angle of the cylindrical probe 13 with respect to the vertical direction by any one or more of the above methods a to d does not need to be particularly limited, and a known method may be used. For example, known feedback control or feedforward control may be used. In order to improve accuracy of this control, preferably, a preliminary test is performed in advance, and a relationship between a total of four factors including the gauge pressure of the inert gas, the fluctuation of the pressure of the inert gas, the temperature of the molten metal at the opening end 131 of the cylindrical probe 13, and the temperature fluctuation of the molten metal at the opening end 131 of the cylindrical probe 13, and the position (immersion depth) of the opening end 131 of the cylindrical probe 13 and the angle of the cylindrical probe 12 with respect to the vertical direction is examined in advance.

The present inventors have found that it is preferable to control the immersion depth in a direction of increasing the immersion depth in order to control the four factors within target ranges (for example, a predetermined range of the gauge pressure of the inert gas, a predetermined range of the pressure fluctuation of the inert gas, a predetermined range of the temperature of the molten metal (a certain temperature or higher), and a fluctuation range of the temperature of the molten metal).

Since the laser device 12 is a precision instrument, it has been generally considered that the laser device 12 is preferably disposed at a position as far away from the plating bath 3 as possible. In addition, when the cylindrical probe 13 is inserted deeply into the plating bath 3, it has been considered that as a result of an increase in the pressure of the molten metal in the plating bath 3, the gauge pressure of the inert gas is not stabilized, and an error is likely to occur in a measured value of the analysis system. Therefore, for example, in the hot-dip galvanizing bath 3, it has been considered preferable to dispose the opening end 131 of the cylindrical probe 13 at a relatively shallow position, for example, at a depth of 10 cm.

On the other hand, the present inventors have found that when the opening end 131 of the cylindrical probe 13 is disposed at a relatively deep position in the plating bath 3, a temperature change of the molten metal is small and the temperature of the molten metal is relatively high, and therefore a change in the viscosity of the molten metal is suppressed, and the gauge pressure of the inert gas is stabilized for a long time. In addition, the present inventors have found that an unintended fluctuation of a measured value of the analysis system is suppressed by disposing the opening end 131 of the cylindrical probe 13 at a position that has been avoided. For example, in order to set the gauge pressure within a range of 10 to 20 kPa, it is preferable to dispose the opening end 131 of the cylindrical probe 13 at a position of 15 to 30 cm from a liquid surface of the hot-dip galvanizing bath.

The present inventors have also found that it is preferable to set the angle of the cylindrical probe 13 with respect to the vertical direction to a constant inclination angle instead of 0° in order to control the above four factors within the above target ranges. Specifically, the angle of the cylindrical probe 13 with respect to the vertical direction is preferably 10 to 20°. The lower limit of the angle is preferably 11° or 12.5°. The upper limit of the angle is preferably 18°, 16° or 15°.

Each of the temperature calculation unit 36, the pressure calculation unit 37, and the position control unit 38 is implemented by hardware including, for example, an arithmetic device such as a CPU, a main storage device such as a read-only memory (ROM) or a random-access memory (RAM), and an auxiliary storage device such as a hard disk or a flash memory. Each of the temperature calculation unit 36, the pressure calculation unit 37, and the position control unit 38 may be constituted by one piece of hardware or a plurality of pieces of hardware. Furthermore, each of the temperature calculation unit 36, the pressure calculation unit 37, and the position control unit 38 may be constituted by the same hardware as the signal processing unit 22 described above. Note that each of the temperature calculation unit 36, the pressure calculation unit 37, and the position control unit 38 may be implemented by an embedded system.

3. Composition Analysis Method

Next, a molten metal bath composition analysis method according to the present embodiment using the composition analysis system 11 described above will be described. Note that, hereinafter, an example of implementing the molten metal bath composition analysis method using the composition analysis system 11 illustrated in FIG. 3 will be described, but the present disclosure is not limited to such an example. That is, a specific aspect of the present disclosure is not particularly limited as long as it has a device configuration capable of implementing the molten metal bath composition analysis method described below.

The molten metal bath composition analysis method according to the present embodiment is a molten metal bath composition analysis method including: immersing a cylindrical probe in a molten metal bath; supplying an inert gas to an opening end of the cylindrical probe; guiding a laser beam to the opening end to irradiate the molten metal with the laser beam; and detecting and spectroscopically analyzing plasma emission of the molten metal caused by the irradiation with the laser beam, in which at least one of a temperature (including a temperature fluctuation, the same applies hereinafter) of the molten metal and a pressure (including a pressure fluctuation, the same applies hereinafter) of the inert gas is measured, and at least one of the position of the opening end in the molten metal bath and the angle of the cylindrical probe with respect to a vertical direction is controlled on the basis of at least one of the temperature of the molten metal and the pressure of the inert gas.

Note that supply of the inert gas, irradiation with a laser beam, and detection and spectroscopic analysis of plasma emission can be performed by known methods. Therefore, detailed description thereof is omitted.

In the present embodiment, in the composition analysis system 11 described above, the pressure of the inert gas may be measured using the pressure sensor and the pressure calculation unit 37. At least one of the position (immersion depth) of the opening end 131 of the cylindrical probe 13 and the angle of the cylindrical probe 13 with respect to the vertical direction can be controlled such that the pressure (including a pressure fluctuations) of the inert gas is within a predetermined range.

In addition, in the present embodiment, in the composition analysis system 11 described above, the temperature of the molten metal at the opening end 131 of the cylindrical probe 13 may be measured using the temperature sensor 31 and the temperature calculation unit 36. At least one of the position (immersion depth) of the opening end 131 of the cylindrical probe 13 and the angle of the cylindrical probe 13 with respect to the vertical direction can be controlled such that the temperature (including a temperature fluctuations) of the molten metal is within a predetermined range.

That is, in the composition analysis system 11 described above, at least one of the position of the opening end 131 of the cylindrical probe 13 in the plating bath 3 and the angle of the cylindrical probe 13 with respect to the vertical direction is controlled by the position control unit 38, the support member 32, and the drive unit 34 such that the pressure (including a pressure fluctuation) of the inert gas and the temperature (including a temperature fluctuations) of the molten metal are within predetermined ranges.

It is preferable to control the position of the opening end 131 of the cylindrical probe 13 in the plating bath 3 and the angle of the cylindrical probe 13 with respect to the vertical direction on the basis of the pressure of the inert gas.

More specifically, in the present embodiment, since the plating bath 3 is a hot-dip galvanizing bath, it is preferable to perform at least one of controlling the position of the opening end 131 of the cylindrical probe 13 and controlling the angle of the cylindrical probe 13 with respect to the vertical direction such that the gauge pressure of the inert gas is within a range of 10 to 20 kPa.

In addition, it is preferable to perform at least one of disposing the opening end 131 of the cylindrical probe 13 and inclining the cylindrical probe 13 with respect to the vertical direction such that a fluctuation of the pressure of the inert gas is 1.0 kPa or less.

In addition, it is preferable to perform at least one of controlling the position of the opening end 131 of the cylindrical probe 13 in the plating bath 3 and controlling the angle of the cylindrical probe 13 with respect to the vertical direction on the basis of the temperature of the molten metal at the opening end 131.

More specifically, in the present embodiment, since the plating bath 3 is a hot-dip galvanizing bath, it is preferable to perform at least one of controlling the position of the opening end 131 of the cylindrical probe 13 to a position where the temperature of the molten metal at the opening end 131 is 440° C. or higher and controlling the angle of the cylindrical probe 13 with respect to the vertical direction.

In addition, it is preferable to perform at least one of controlling the position of the opening end 131 of the cylindrical probe 13 in the plating bath 3 and controlling the angle of the cylindrical probe 13 with respect to the vertical direction on the basis of a temperature fluctuation of the molten metal at the opening end 131.

More specifically, it is preferable to perform at least one of controlling the position of the opening end 131 of the cylindrical probe 13 to a position where the fluctuation of the temperature of the molten metal at the opening end 131 is within 5° C. and controlling the angle of the cylindrical probe 13 with respect to the vertical direction.

As described above, according to the present embodiment, by controlling at least one of the position of the opening end 131 of the cylindrical probe 13 and the angle of the cylindrical probe 13 with respect to the vertical direction, it is possible to suppress a fluctuation of a measured value of a composition in continuous composition analysis of the molten metal bath over a long time. That is, according to the present embodiment, a measured value of a composition of the molten metal measured by LIBS is a value having a small difference from a true value of the composition of the molten metal bath, which is closer to the true value. Therefore, the present disclosure is suitable for continuously monitoring and managing a constituent composition of the molten metal bath.

Note that, as described above, the present embodiment is suitable for composition management of a hot-dip galvanizing bath, for example, management of Fe and Al concentrations. Therefore, in another aspect, the present embodiment also relates to a hot-dip galvanizing bath management method including: a step of measuring a composition concentration including a concentration of at least one of Fe and Al in a hot-dip galvanizing bath using the method described above; and a step of controlling the amount of each constituent composition in the hot-dip galvanizing bath on the basis of the measured composition concentration including a concentration of at least one of Fe and Al.

Furthermore, a hot-dip galvanized steel sheet can be suitably manufactured using the hot-dip galvanizing bath thus managed. Therefore, in another aspect, the present disclosure also relates to a hot-dip galvanized steel sheet manufacturing method including: a step of measuring a composition concentration including a concentration of at least one of Fe and Al in a hot-dip galvanizing bath using the method described above; and a step of controlling the amount of each constituent composition in the hot-dip galvanizing bath on the basis of the measured composition concentration including a concentration of at least one of Fe and Al.

The present disclosure has been described above on the basis of the preferred embodiments of the present disclosure, but the present disclosure is not limited thereto. The above embodiments are merely examples, and anything having substantially the identical configuration as the technical idea described in the claims of the present disclosure and exhibiting similar operation and effects is included in the technical scope of the present disclosure.

In addition, fixing and control of the position of the opening end 131 of the cylindrical probe 13 are not limited to the above-described aspects, and any fixing means and control means can be adopted. In addition, the cylindrical probe may movable not only in the depth direction of the molten metal bath but also in another direction, for example, a horizontal direction.

In addition, when the temperature of the molten metal at the opening end 131 of the cylindrical probe 13 is measured using the temperature sensor 31 and the temperature calculation unit 36, the pressure of the inert gas may be measured using the pressure sensor and the pressure calculation unit 37.

In addition, the molten metal bath composition analysis system may include a mass flow controller for measuring a flow rate of the inert gas. In a case where the mass flow controller is included, the pressure sensor only needs to be disposed at a subsequent stage of the mass flow controller.

In addition, for example, in the above-described embodiments, the molten metal bath has been described as a hot-dip galvanizing bath, but the present disclosure is not limited thereto, and can be applied to a molten metal bath for any metal.

EXAMPLES

Hereinafter, the present disclosure will be described in more detail with reference to Examples. Note that Examples described below are merely examples of the present disclosure, and do not limit the present disclosure.

Example 1

First, a plurality of molten zinc baths prepared so as to each have an Al concentration of 0.125 to 0.143 mass % were prepared. An Al concentration and an Fe concentration in each of the molten zinc baths were measured under the following conditions.

As a laser, Ultra manufactured by Quantel Corporation was used. As laser oscillation conditions, a wavelength was 1064 nm, an output was 100 mJ/pulse, and a frequency was 20 Hz. An oscillated laser passed through a silicon nitride-based ceramic probe having an inner diameter of about 30 mm, and was condensed by a synthetic quartz lens so as to be focused on a surface of the molten zinc bath. An argon gas was supplied at a flow rate of 0.75 L/min toward a distal end portion (opening end) of the cylindrical probe.

Light emission that had occurred on a surface of the molten zinc bath by laser irradiation was shifted by 90° from an optical axis of the laser by a dichroic mirror via the cylindrical probe, condensed by the lens, and then transmitted to a spectroscope through a 25 m optical fiber. As the spectroscope, a combination of a spectroscope MSDD1000 manufactured by SOL Instruments and an iCCD camera iStar manufactured by Oxford Instruments was used. Among emission spectra obtained by 300 seconds (6000 pulses of laser irradiation), a spectral intensity of each of Al: 308.2 nm and Fe: 259.9 nm normalized with a spectral intensity of Zn: 303.1 nm was integrated, and quantified by a separately prepared calibration curve.

The cylindrical probe including a temperature sensor (thermocouple) at a distal end portion (opening end) thereof was immersed in the molten zinc bath, and a concentration of each of dissolved Al and dissolved Fe in the molten zinc bath was measured continuously for 18 hours or 24 hours. At the time of the measurement, a temperature was monitored by a temperature sensor at the distal end portion of the probe. A gauge pressure of an argon gas was monitored using a diaphragm type pressure gauge (digital pressure gauge KDM30 manufactured by Clone Corporation) disposed at a subsequent stage of a mass flow controller.

For each of the molten zinc baths, at least one of the position of the opening end of the cylindrical probe in the vertical direction and the angle of the cylindrical probe with respect to the vertical direction was controlled, and at least one control item of a temperature of the molten zinc bath measured by the temperature sensor, a fluctuation of the temperature of the molten zinc bath measured by the temperature sensor, a gauge pressure of an argon gas, and a fluctuation of the gauge pressure of the argon gas was controlled. Note that, in Comparative Example presented in Table 1, during measurement, the position of the opening end of the cylindrical probe in the vertical direction was set to a constant position, and the angle of the cylindrical probe with respect to the vertical direction was fixed to 0°. In "Control range" in Table 1, a control range of each of the control items is described. In the item "Control range", "T" represents a temperature of the molten zinc bath measured by the temperature sensor, "ΔT" represents a fluctuation of the temperature of the molten zinc bath measured by the temperature sensor, "P" represents a gauge pressure of an argon gas, and "ΔP" represents a fluctuation of the gauge pressure of the argon gas.

In addition, in the item "Position of probe opening end" in "Presence or absence of control" in Table 1, presence or absence of control of the position of the opening end of the cylindrical probe in the vertical direction is described. In addition, in the item "Angle of probe" in Table 1, presence or absence of control of the angle of the opening end of the cylindrical probe with respect to the vertical direction is described.

Sampling was performed from the molten zinc bath at a frequency of once every several hours, and the sampled molten zinc was solidified. The solidified product was acid-dissolved and analyzed by ICP, and an Al concentration and an Fe concentration were measured. The measured Al concentration and Fe concentration were used as reference values. In the item "Average value of differences between Al concentration and ICP analysis value" in Table 1, an average value of differences between an Al concentration measured by the molten metal composition analysis system of the present disclosure and the reference value obtained at the closest timing is presented.

In the item "Fluctuation range of each parameter" in Table 1, a control result of each of the control items is described. In "Position of probe opening end (cm)", a fluctuation range of the position of the opening end of the cylindrical probe in the vertical direction is described. The position of the opening end of the cylindrical probe in the vertical direction was based on the position thereof at the start of the measurement, and rising was described as "+", and lowering was described as "−". In "Angle of probe (°)", a range of the angle of the cylindrical probe with respect to the vertical direction is described. In "Gauge pressure (kPa)", a range of a gauge pressure of an argon gas is described. In "Temperature of molten metal (° C.)", a temperature range of the molten zinc bath measured by the temperature sensor is described.

result, an average value of differences between the Al concentration and the ICP analysis value was 38 ppm. In Example 2, the angle of the cylindrical probe with respect to the vertical direction was 11.0 to 17.5°, the gauge pressure of the argon gas was 14.0 to 15.0 kPa (fluctuation range was 1.0 kPa), and the temperature of the molten zinc bath measured by the temperature sensor was 460 to 465° C.

In Example 3, the position of the opening end of the cylindrical probe in the vertical direction and the angle of the cylindrical probe with respect to the vertical direction were controlled such that the gauge pressure of the argon gas was 10.0 to 20.0 kPa and the fluctuation range of the gauge pressure of the argon gas was 1.0 kPa or less. As a result, an average value of differences between the Al concentration and the ICP analysis value was 26 ppm. In Example 3, the fluctuation of the position of the opening end of the cylindrical probe in the vertical direction was −2 to +5 cm, the angle of the cylindrical probe with respect to the vertical direction was 12.5 to 15.0°, the gauge pressure of the argon gas was 14.0 to 15.0 kPa (fluctuation range was 1.0 kPa), and the temperature of the molten zinc bath measured by the temperature sensor was 462 to 466° C.

TABLE 1

| No. | Control method | | | | Control effect | | | | | |
| | Control range | Presence or absence of control | | Average value of differences between Al concentration and ICP analysis value (ppm) | Fluctuation range of each parameter | | | | |
| | | Position of probe opening end | Angle of probe | | Position of probe opening end (cm) | Angle of probe (°) | Gauge pressure (kPa) | Temperature of molten metal (° C.) |
|---|---|---|---|---|---|---|---|---|
| Example 1 | T ≥ 440° C. P = 10 to 20 kPa | Present | Absent | 70 | −5 to +3 | ±0 | 12.3 to 15.0 | 440 to 465 |
| Example 2 | P = 10 to 20 kPa ΔP ≤ 1.0 kPa | Absent | Present | 38 | ±0 | 11.0 to 17.5 | 14.0 to 15.0 | 460 to 465 |
| Example 3 | P = 10 to 20 kPa ΔP ≤ 1.0 kPa | Present | Present | 26 | −2 to +5 | 12.5 to 15.0 | 14.0 to 15.0 | 462 to 466 |
| Example 4 | T ≥ 440° C. | Present | Absent | 75 | −5 to 0 | ±0 | 8.2 to 12.4 | 440 to 470 |
| Example 5 | ΔT ≤ 5° C. | Present | Present | 41 | −4 to +3 | 12.5 to 15.0 | 8.4 to 10.2 | 440 to 445 |
| Example 6 | P = 10 to 20 kPa | Present | Present | 51 | 0 to +5 | 11.2 to 17.3 | 14.0 to 17.8 | 430 to 465 |
| Example 7 | ΔP ≤ 1.0 kPa | Present | Present | 48 | −2 to +5 | 14.2 to 15.7 | 9.5 to 10.3 | 435 to 460 |
| Comparative Example | Position of probe opening end and angle of probe are fixed (Position: ±0 mm, Angle: ±0°) | | | 82 | ±0 | ±0 | 8.0 to 8.5 | 456 to 466 |

In Example 1, the position of the opening end of the cylindrical probe in the vertical direction was controlled such that the temperature of the molten zinc bath measured by the temperature sensor was 440° C. or higher and the gauge pressure of the argon gas was 10 to 20 kPa. The angle of the cylindrical probe with respect to the vertical direction was set to 0°. As a result, in Example 1, an average value of differences between the Al concentration and the ICP analysis value was 70 ppm. In Example 1, the fluctuation of the position of the opening end of the cylindrical probe in the vertical direction was −5 to +3 cm, the gauge pressure of the argon gas was 12.3 to 15.0 kPa, and the temperature of the molten zinc bath measured by the temperature sensor was 440 to 465° C.

In Example 2, the angle of the cylindrical probe with respect to the vertical direction was controlled such that the gauge pressure of the argon gas was 10 to 20 kPa and the fluctuation range of the gauge pressure of the argon gas was 1.0 kPa or less. The position of the opening end of the cylindrical probe in the vertical direction was constant. As a In Example 4, the position of the opening end of the cylindrical probe in the vertical direction was controlled such that the temperature of the molten zinc bath measured by the temperature sensor was 440° C. or higher. The angle of the cylindrical probe with respect to the vertical direction was set to 0°. As a result, an average value of differences between the Al concentration and the ICP analysis value was 75 ppm. In Example 4, the fluctuation of the position of the opening end of the cylindrical probe in the vertical direction was −5 to 0 cm, the gauge pressure of the argon gas was 8.4 to 12.4 kPa, and the temperature of the molten zinc bath measured by the temperature sensor was 440 to 470° C.

In Example 5, the position of the opening end of the cylindrical probe in the vertical direction and the angle of the cylindrical probe with respect to the vertical direction were controlled such that the fluctuation of the temperature of the molten zinc bath measured by the temperature sensor was within 5° C. As a result, an average value of differences between the Al concentration and the ICP analysis value was 41 ppm. In Example 5, the fluctuation of the position of the opening end of the cylindrical probe in the vertical direction was −4 to +3 cm, the angle of the cylindrical probe with respect to the vertical direction was 12.5 to 15.0°, the gauge pressure of the argon gas was 8.4 to 10.2 kPa, and the temperature of the molten zinc bath measured by the temperature sensor was 440 to 445° C.

In Example 6, the position of the opening end of the cylindrical probe in the vertical direction and the angle of the cylindrical probe with respect to the vertical direction were controlled such that the gauge pressure of the argon gas was 10.0 to 20.0 kPa. As a result, an average value of differences between the Al concentration and the ICP analysis value was 51 ppm. In Example 6, the fluctuation of the position of the opening end of the cylindrical probe in the vertical direction was 0 to +5 cm, the angle of the cylindrical probe with respect to the vertical direction was 11.2 to 17.3°, the gauge pressure of the argon gas was 14.0 to 17.8 kPa, and the temperature of the molten zinc bath measured by the temperature sensor was 430 to 465° C.

In Example 7, the position of the opening end of the cylindrical probe in the vertical direction and the angle of the cylindrical probe with respect to the vertical direction were controlled such that the fluctuation range of the gauge pressure of the argon gas was 1.0 kPa or less. As a result, an average value of differences between the Al concentration and the ICP analysis value was 48 ppm. In Example 7, the fluctuation of the position of the opening end of the cylindrical probe in the vertical direction was −2 to +5 cm, the angle of the cylindrical probe with respect to the vertical direction was 14.2 to 15.7°, the gauge pressure of the argon gas was 9.5 to 10.3 kPa (fluctuation range was 0.8 kPa), and the temperature of the molten zinc bath was 435 to 460° C.

In Comparative Example 1, the position of the opening end of the cylindrical probe in the vertical direction was constant, and the angle of the cylindrical probe with respect to the vertical direction was constant at about 0°. As a result, an average value of differences between the Al concentration and the ICP analysis value was 82 ppm. In Comparative Example, the gauge pressure of the argon gas was 8.0 to 8.5 kPa, and the temperature of the zinc bath measured by the temperature sensor was 456 to 466° C.

As indicated by the above results, it has been found that by measuring at least one of the temperature of the molten zinc bath and the pressure of the argon gas, and controlling at least one of the position of the opening end in the molten zinc bath and the angle of the cylindrical probe with respect to the vertical direction on the basis of at least one of the measured temperature of the molten zinc bath and the measured pressure of the argon gas, the average value of differences from the ICP analysis value can be reduced, and stable and highly accurate measurement is possible.

Example 2

Figure 4:
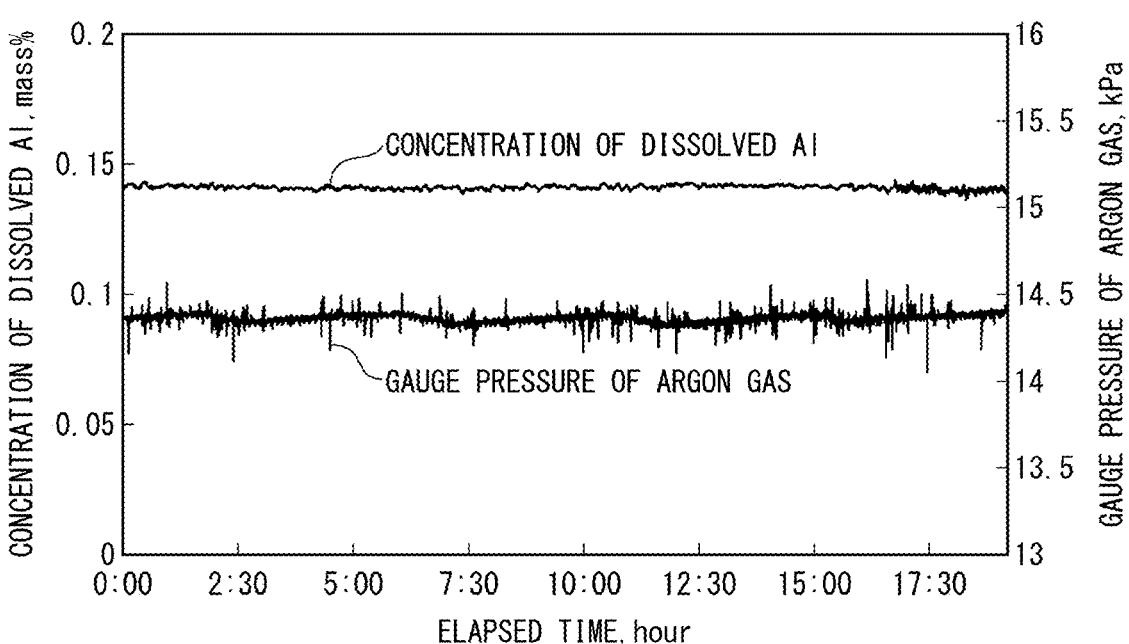
FIG. 4 is a graph chart illustrating time-dependent changes in the concentration of dissolved Al and the gauge pressure of an argon gas, measured in Example 2.

FIG. 4 illustrates time-dependent changes in a concentration of dissolved Al and a gauge pressure of an argon gas, obtained by performing a test using an actual machine under the conditions of Example 2 using a hot-dip galvanizing bath as illustrated in FIGS. 1 to 3. As illustrated in FIG. 4, the concentration of dissolved Al indicates a constant value, and stability of a signal was high, and accuracy (3σ) was 21 ppm by integration of 6000 pulses and 34 ppm by integration of 2000 pulses.

Furthermore, as a result of continuous measurement for 19 days, the Al and Fe concentrations were constant. Therefore, it has been demonstrated that the Al and Fe concentrations can be stably measured over a long time by the above method.

Figure 5:
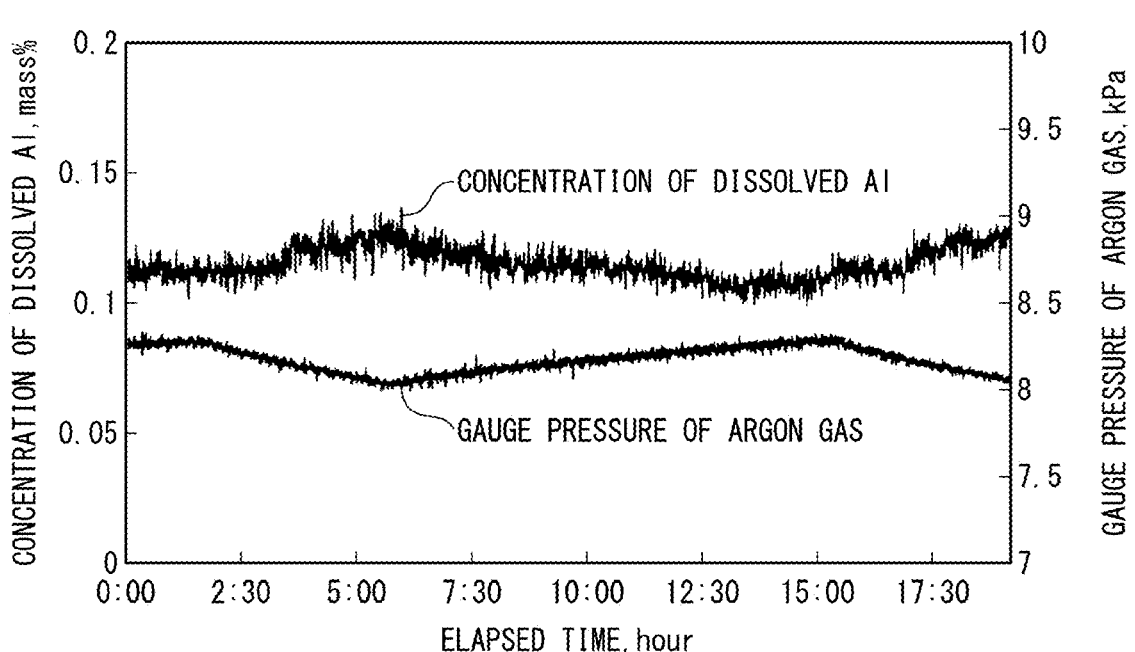
FIG. 5 is a graph chart illustrating time-dependent changes in the concentration of dissolved Al and the gauge pressure of an argon gas, measured in Comparative Example 1.

FIG. 5 illustrates time-dependent changes in a concentration of dissolved Al and a gauge pressure of an argon gas, obtained by performing a test using an actual machine under the conditions of Comparative Example 1 using a hot-dip galvanizing bath as illustrated in FIGS. 1 to 3. The concentration of dissolved Al in the molten zinc bath at the time of measurement was 0.125 mass % and was constant according to an analysis value by high frequency inductively coupled plasma atomic emission spectrometry (ICP atomic emission spectrometry), but as illustrated in FIG. 5, a large time-dependent fluctuation was observed in the measured value of the dissolved Al concentration obtained in Comparative Example 1, and it was suggested that stable plasma emission did not occur.

The gauge pressure of the argon gas was within a range of 8.0 to 8.5 kPa, but there was a time-dependent fluctuation of the gauge pressure, and the fluctuation of the dissolved Al concentration is considered to be due to this influence (that is, the influence of the fluctuation of the gauge pressure). A measured value of the temperature at the opening end of the cylindrical probe was less than 440° C. in some cases.

Example 3

Figure 6:
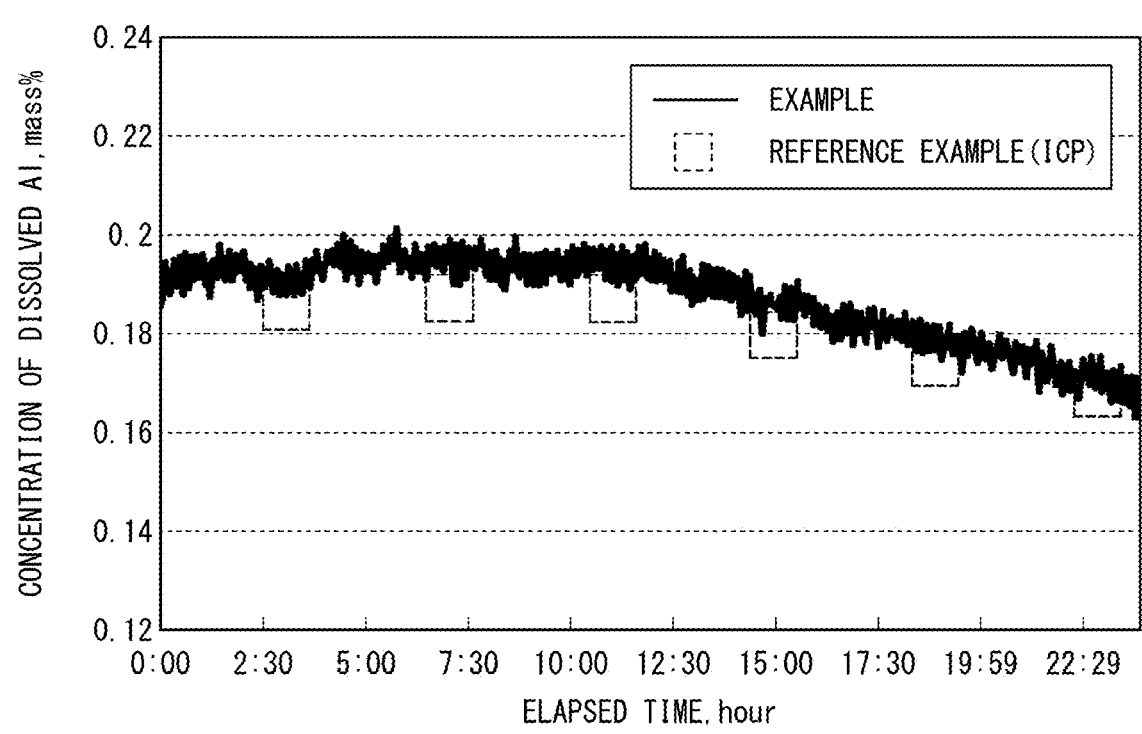
FIG. 6 is a graph chart illustrating a time-dependent change in the concentration of dissolved Al measured in Example 3.
Figure 7:
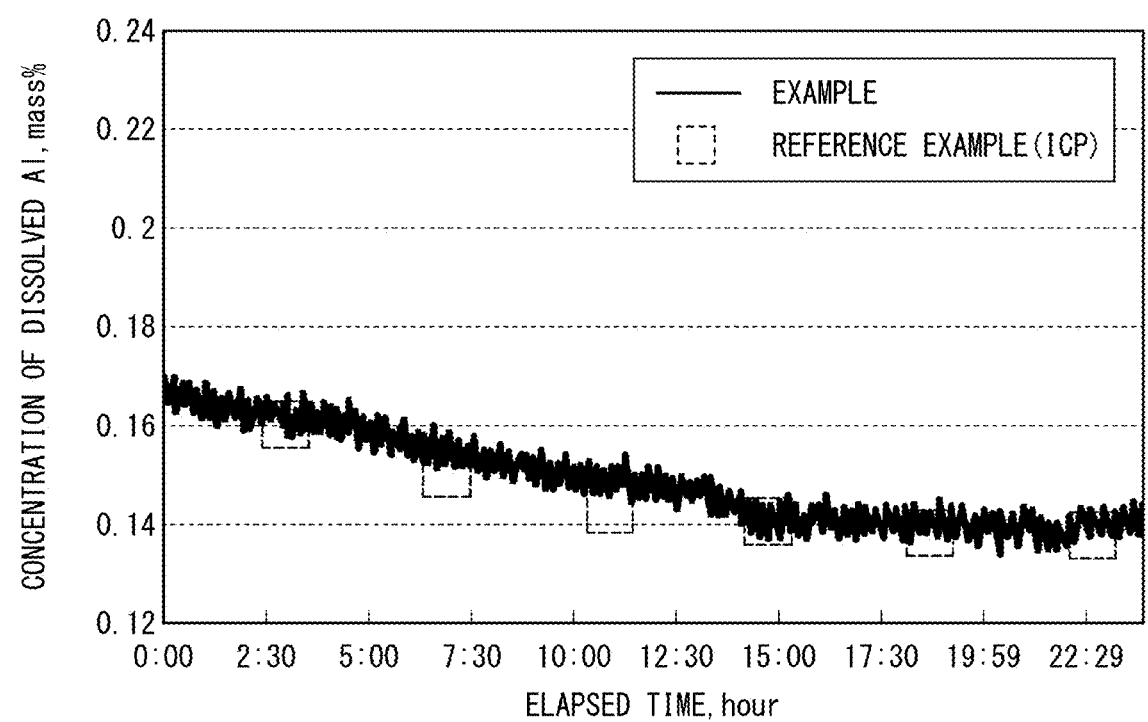
FIG. 7 is a graph chart illustrating a time-dependent change in the concentration of dissolved Al measured in Example 3.
Figure 8:
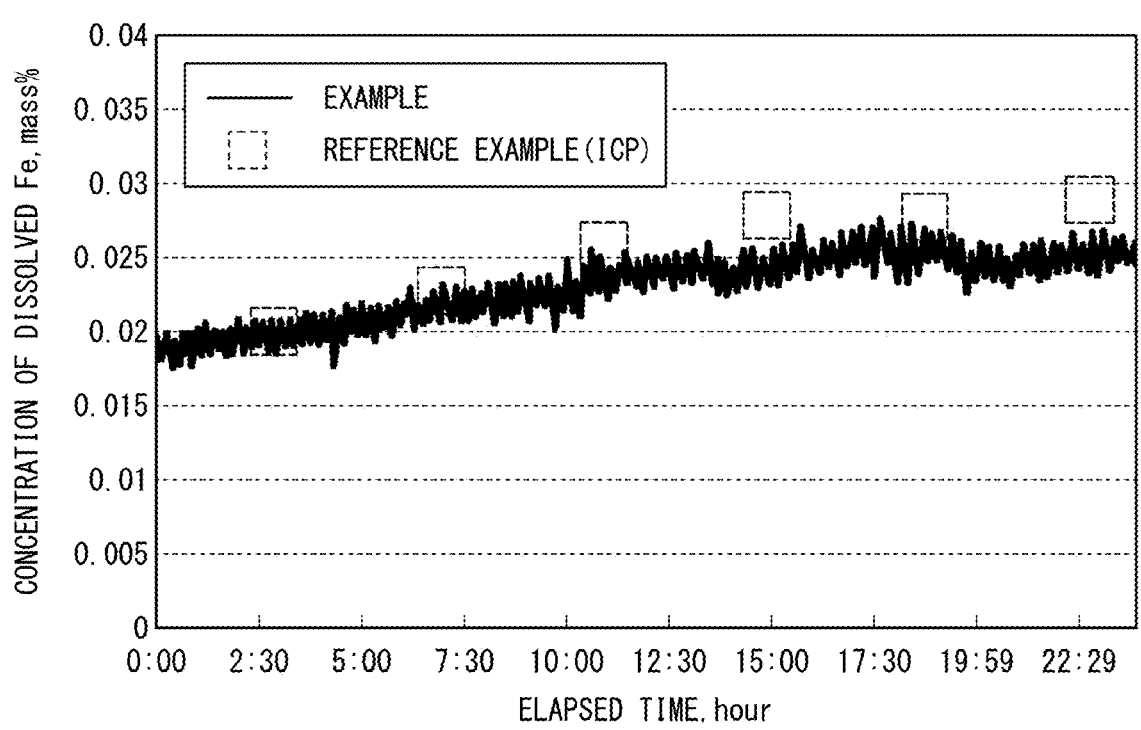
FIG. 8 is a graph chart illustrating a time-dependent change in the concentration of dissolved Fe measured in Example 3.
Figure 9:
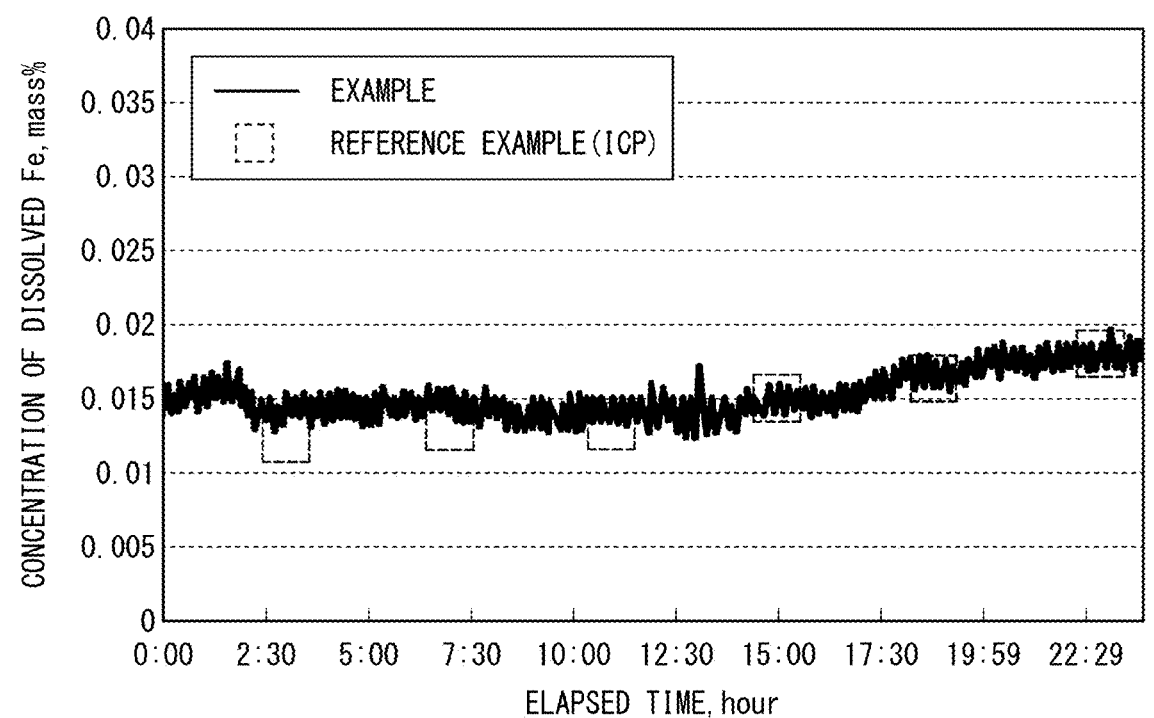
FIG. 9 is a graph chart illustrating a time-dependent change in a concentration of dissolved Fe measured in Example 3.

FIGS. 6 and 7 illustrate a change in the concentration of dissolved Al obtained by performing a test using an actual machine under the conditions of Example 3 using a hot-dip galvanizing bath as illustrated in FIGS. 1 to 3, together with a concentration of dissolved Al by ICP analysis as a reference example. Here, FIG. 7 is a test result at a timing different from that of the test of FIG. 6. FIGS. 8 and 9 illustrate a change in the concentration of dissolved Fe measured by Example 3 together with a concentration of dissolved Fe by ICP analysis as a reference example. Here, FIG. 9 is a test result at a timing different from that of the test of FIG. 8.

As illustrated in FIGS. 6 to 9, each of the concentrations of dissolved Al and dissolved Fe measured by Example 3 indicated a values close to the concentrations measured by ICP analysis as a reference example. In addition, for example, even in a case where the concentration of dissolved Al changed from 0.2 mass % to 0.14 mass %, in the present Example, a measured value following such a change in concentration was exhibited.

Although the preferred embodiments of the present disclosure have been described in detail with reference to the accompanying drawings, the present disclosure is not limited to such examples. It is obvious that a person having ordinary knowledge in the technical field to which the present disclosure belongs can conceive various changes or modifications within the scope of the technical idea described in the claims, and it is naturally understood that these also belong to the technical scope of the present disclosure.

BRIEF DESCRIPTION OF THE REFERENCE SYMBOLS

1 Hot-dip galvanizing device
2 Steel strip
3 Plating bath
4 Plating tank
5 Snout
6 In-bath roll

7 Support roll
8 Inductor
9 Gas wiping device
10 Alloying furnace
11 Composition analysis system
12 Laser device
13 Cylindrical probe
131 Opening end
14 Transmission cable
20 Processing device
21 Detection unit
22 Signal processing unit
30 Position controller
31 Temperature sensor
32 Support member
33 Fixing member
34 Drive unit
35 Transmission cable
36 Temperature calculation unit
37 Pressure calculation unit
38 Position control unit

The invention claimed is:

1. A molten metal bath composition analysis system comprising:

a laser oscillator that oscillates a laser beam;

a cylindrical probe that includes an opening end immersed in a molten metal bath, supplies an inert gas toward the opening end, and guides the laser beam to the opening end to irradiate a molten metal with the laser beam; and a detector that detects and spectroscopically analyzes plasma emission of the molten metal caused by the irradiation with the laser beam, wherein at least one of a position of the opening end of the cylindrical probe in the molten metal bath and an angle of the cylindrical probe with respect to a vertical direction can be controlled, the molten metal bath composition analysis system comprises a pressure sensor that measures a pressure of the inert gas, and at least one of the position of the opening end of the cylindrical probe and the angle of the cylindrical probe with respect to the vertical direction is controlled on a basis of the pressure of the inert gas obtained by the pressure sensor.

2. The molten metal bath composition analysis system according to claim 1, wherein at least one of the position of the opening end of the cylindrical probe and the angle of the cylindrical probe with respect to the vertical direction is controlled by any one or more of the following:

controlling a gauge pressure of the inert gas obtained by the pressure sensor to be within a predetermined range;

controlling a fluctuation of the pressure of the inert gas to be equal to or less than a predetermined value;

controlling the temperature of the molten metal to be equal to or higher than a predetermined temperature; and controlling a temperature fluctuation of the molten metal to be equal to or less than a predetermined value.

3. The molten metal bath composition analysis system according to claim 1, wherein the molten metal contains molten zinc, and the molten metal bath is a hot-dip galvanizing bath.

4. The molten metal bath composition analysis system according to claim 3, comprising a pressure sensor that measures a pressure of the inert gas, wherein at least one of the position of the opening end of the cylindrical probe and the angle of the cylindrical probe with respect to the vertical direction is controlled such that a gauge pressure of the inert gas obtained by the pressure sensor is within a range of 10 to 20 kPa.

5. The molten metal bath composition analysis system according to claim 3, comprising a pressure sensor that measures a pressure of the inert gas, wherein at least one of the position of the opening end of the cylindrical probe and the angle of the cylindrical probe with respect to the vertical direction is controlled such that a fluctuation of the pressure of the inert gas obtained by the pressure sensor is 1.0 kPa or less.

6. The molten metal bath composition analysis system according to claim 3, comprising a temperature sensor that measures a temperature of the molten metal at the opening end, wherein at least one of the position of the opening end of the cylindrical probe and the angle of the cylindrical probe with respect to the vertical direction is controlled such that the temperature of the molten metal measured by the temperature sensor is 440° C. or higher.

7. The molten metal bath composition analysis system according to claim 1, comprising a temperature sensor that measures a temperature of the molten metal at the opening end, wherein at least one of the position of the opening end of the cylindrical probe and the angle of the cylindrical probe with respect to the vertical direction is controlled such that a fluctuation of the temperature of the molten metal measured by the temperature sensor is within 5° C.

8. A molten metal bath composition analysis method comprising:

immersing a cylindrical probe in a molten metal bath;

supplying an inert gas to an opening end of the cylindrical probe;

guiding a laser beam to the opening end to irradiate a molten metal with the laser beam; and detecting and spectroscopically analyzing plasma emission of the molten metal caused by the irradiation with the laser beam, wherein a pressure of the inert gas is measured, and at least one of a position of the opening end in the molten metal bath and an angle of the cylindrical probe with respect to a vertical direction is controlled on a basis of the pressure of the inert gas.

9. The molten metal bath composition analysis method according to claim 8, wherein at least one of the position of the opening end of the cylindrical probe and the angle of the cylindrical probe with respect to the vertical direction is controlled by any one or more of the following:

controlling a gauge pressure of the inert gas to be within a predetermined range;

controlling a fluctuation of the pressure of the inert gas to be equal to or less than a predetermined value;

controlling the temperature of the molten metal to be equal to or higher than a predetermined temperature; and controlling a temperature fluctuation of the molten metal to be equal to or less than a predetermined value.

10. The molten metal bath composition analysis method according to claim 8, wherein the molten metal is molten zinc, and the molten metal bath is a hot-dip galvanizing bath.

11. The molten metal bath composition analysis method according to claim 10, wherein at least one of controlling the position of the opening end of the cylindrical probe and controlling the angle of the cylindrical probe with respect to the vertical direction is performed such that a gauge pressure of the inert gas is within a range of 10 to 20 kPa.

12. The molten metal bath composition analysis method according to claim 10, wherein at least one of controlling the position of the opening end of the cylindrical probe and controlling the angle of the cylindrical probe with respect to the vertical direction is performed such that a fluctuation of the pressure of the inert gas is within 1.0 kPa.

13. The molten metal bath composition analysis method according to claim 10, wherein at least one of controlling the position of the opening end of the cylindrical probe and controlling the angle of the cylindrical probe with respect to the vertical direction is performed such that the temperature of the molten metal is 440° C. or higher.

14. The molten metal bath composition analysis method according to claim 10, wherein at least one of controlling the position of the opening end of the cylindrical probe and controlling the angle of the cylindrical probe with respect to the vertical direction is performed such that a fluctuation of the temperature of the molten zinc at the opening end is within 5° C.

15. A hot-dip galvanizing bath management method comprising:

measuring a concentration of at least one of Al and Fe in a hot-dip galvanizing bath by the molten metal bath composition analysis method according to claim 8; and controlling a concentration of either of Fe and Al in the hot-dip galvanizing bath on a basis of the concentration.

16. A hot-dip galvanized steel sheet manufacturing method comprising:

measuring a concentration of at least one of Fe and Al in a hot-dip galvanizing bath by the molten metal bath composition analysis method according to claim 8; and controlling an amount of either of Fe and Al in the hot-dip galvanizing bath on a basis of the concentration.

* * * * *